United States Patent [19]

Ishii et al.

[11] 4,450,038

[45] May 22, 1984

[54] HOT AIR BLAST WELDING APPARATUS FOR THERMOPLASTIC PARTS

[75] Inventors: Masami Ishii, Toyota; Hitoshi Sugimoto, Nagoya; Shinji Takeda, Toyota; Susumu Shibata, Okazaki, all of Japan

[73] Assignee: Aisin Seiki Kabushiki Kaisha, Kariya, Japan

[21] Appl. No.: 349,713

[22] Filed: Feb. 18, 1982

[30] Foreign Application Priority Data

Feb. 26, 1981 [JP] Japan ................................ 56-28150

[51] Int. Cl.³ ............................................. B32B 35/00
[52] U.S. Cl. ............................... 156/497; 156/304.1; 156/304.2; 156/304.6
[58] Field of Search ................. 156/158, 304.1, 304.2, 156/304.6, 497, 499

[56] References Cited

U.S. PATENT DOCUMENTS

| | | | |
|---|---|---|---|
| 3,488,244 | 1/1970 | Lepisto | 156/497 |
| 3,884,746 | 5/1975 | Löliger et al. | 156/497 |
| 3,953,272 | 4/1976 | Webber | 156/497 |
| 3,998,682 | 12/1976 | Harmsen | 156/148 |
| 4,094,725 | 6/1978 | Takeda et al. | 146/497 |

FOREIGN PATENT DOCUMENTS

| | | | |
|---|---|---|---|
| 1239270 | 7/1971 | United Kingdom | 156/497 |
| 423668 | 4/1974 | U.S.S.R. | 156/158 |

*Primary Examiner*—Caleb Weston
*Attorney, Agent, or Firm*—Finnegan, Henderson, Farabow, Garrett & Dunner

[57] ABSTRACT

A hot air blast welding apparatus for welding works of thermoplastic materials having different softening temperatures. The apparatus includes a nozzle having nozzle openings for applying hot blasts of air to respective ones of the works. The nozzle is so constructed that it applies air blasts of different temperatures or different flow rates to the works so that the works are brought substantially simultaneously to softening points.

3 Claims, 11 Drawing Figures

HOT AIR BLAST WELDING APPARATUS FOR THERMOPLASTIC PARTS

The present invention relates to a welding apparatus for thermoplastic parts and more particularly to an apparatus for welding hollow thermoplastic parts by means of hot air blasts. More specifically, the present invention pertains to a nozzle structure which is suitable for welding hollow parts of different materials.

In Japanese patent application No. 51-6981 which was filed on Jan. 23, 1976 and disclosed for public inspection on July 29, 1977 under the disclosure No. 52-90584 (U.S. Pat. No. 4,094,725), there is disclosed a hot air blast apparatus for welding hollow thermoplastic parts. The apparatus includes a pair of opposed work holding arms which can be move to and from each other so that a pair of hollow thermoplastic parts carries thereon can be brought into end-to-end abutting relationship by moving the work holding arms toward each other. A hot air blasting device is provided adjacent to the space between the work holding arms and has a hot air blasting nozzle which can be brought into and out of the space between the work holding arms. The nozzle is formed on both sides with nozzle openings which are adapted to be placed opposite to edges of the parts to be welded. In this position the nozzle can apply blasts of hot air to the edges of the parts, which are being held on the work holding arms, until the edges of the parts are softened by the heat of the blast air. Thereafter, the nozzle is retracted from the space between the work holding arms and the arms are then moved toward each other until the softened edges of the parts are brought into contact with each other and thereby welded together.

According to the structure as proposed by the Japanese patent application, the edges of the parts to be welded are equally heated so that satisfactory welding can be accomplished as long as the parts to be welded are of the same material. It has however been experienced that the apparatus has not been satisfactory when it is used for welding parts which have different melting points. For example, it has been impossible to weld a part of ABS resin to a part of vinyl chloride.

It is therefore an object of the present invention to provide a nozzle structure for a hot air blast plastic welding apparatus which can be used for welding plastic parts of different material.

Another object of the present invention is to provide a hot air blast nozzle structure which can bring parts of different melting points substantially simultaneously to their softening temperatures.

According to the present invention, the above and other objects can be accomplished by a hot air blast welding apparatus comprising a pair of opposed work holding arms which are movable toward and away from each other and respectively have means for holding hollow works having edges to be welded together, hot air blasting means including hot air blast nozzle means movable between an operative position in which said nozzle means is located between the works held on said arms and a retracted position in which said nozzle means is retracted so that the works on the arms can be brought into abutting engagement with each other by moving the arms toward each other, said nozzle means being formed with first nozzle openings facing toward one work held on one of the arms as well as with second nozzle openings facing toward the other work held on the other arm, means for supplying hot air of different heat values respectively to said first and second nozzle openings. According to the features of the present invention, the works on the work holding arms are applied with heat of different values so that where the works are formed of materials having different melting points their welding edges will become softened at substantially the same time by properly determining the heat values applied thereto.

According to one mode of the present invention, the first and second nozzle openings are connected through separate conduit means to blast air source means, and means are provided for separately controlling the temperature of the air passing through respective conduit means. Such temperature control means may be heating means respectively provided in the conduit means. According to an alternative mode of the present invention, the first and second nozzle openings are connected through common conduit means to hot blast air source means and means is provided for directing different amounts of hot air respectively to the first and second nozzle openings from the conduit means. Such means for directing different amount of hot air may be embodied in the form of a flow restriction provided between the conduit means and one of the first and second nozzle openings. The nozzle openings may comprise a plurality of small apertures arranged in shapes corresponding to edges of the work to be welded so that the edges be effectively applied with a blast of hot air.

The above and other objects and features of the present invention will become apparent from the following descriptions of preferred embodiments taking reference to the accompanying drawings, in which.

Figure 1:
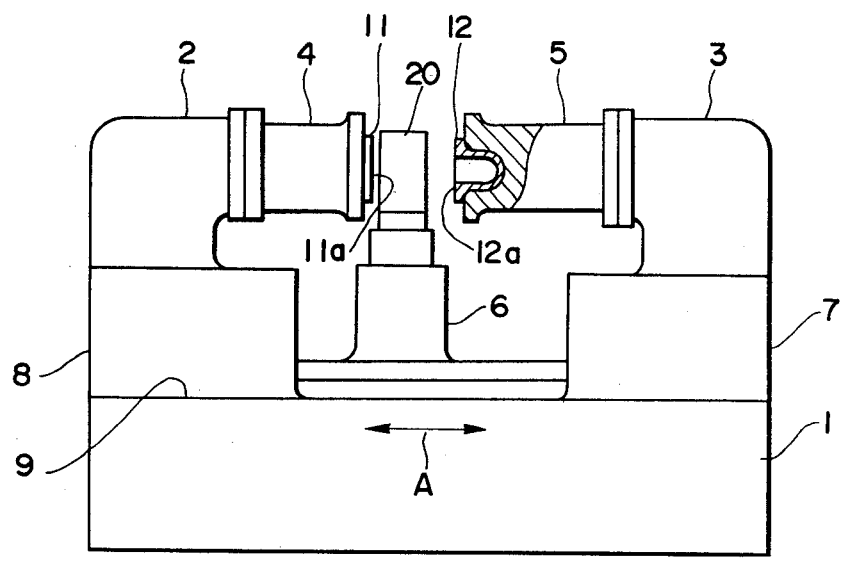
FIG. 1 is a partially sectional side elevational view of a hot air blast welding apparatus to which the present invention can be applied.
Figure 2:
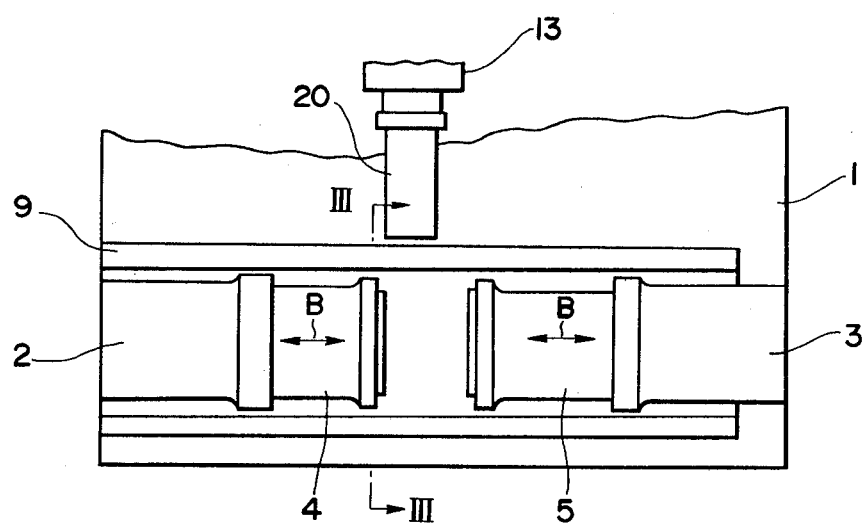
FIG. 2 is a top plan view of the apparatus shown in FIG. 1.
Figure 3:
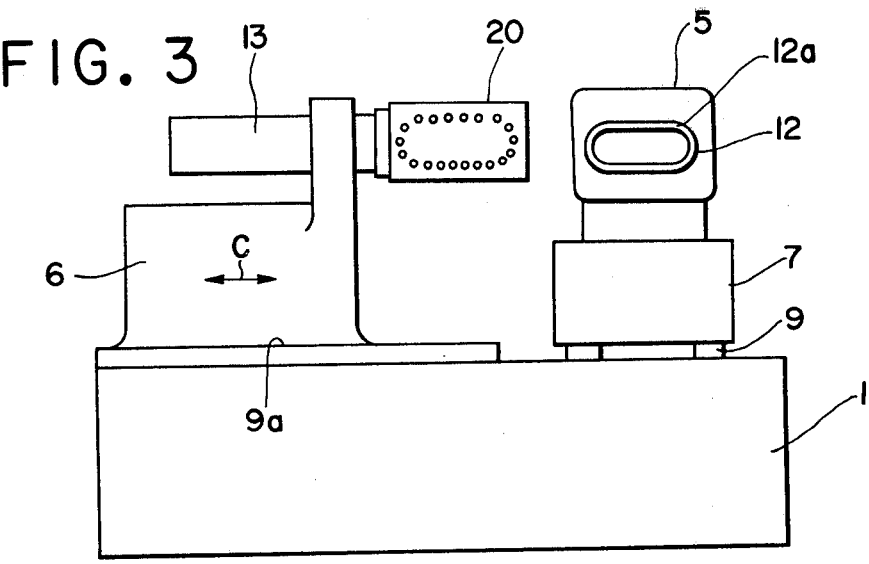
FIG. 3 is an end view as seen substantially along the arrow III—III in FIG. 2.

Referring now to the drawings, particularly to FIGS. 1 through 3, the hot air blast welding apparatus shown therein includes a base 1 which supports three carriages 6, 7 and 8. The carriages 7 and 8 are supported on a guide 9 for slidable movement in the direction shown by arrows A and B in FIGS. 1 and 2. The carriage 6 is supported on a guide 9a for slidable movement in the direction shown by an arrow C in FIG. 3.

On the carriage 8, there is provided a work holding arm 2 having a work-holder 4. Similarly, the carriage 7 is provided with a work holding arm 3 having a work holder 5. The work holders 4 and 5 are provided at their free ends with recesses which are adapted to receive and hold works 11 and 12 respectively. The work holders 4 and 5 are axially aligned with each other so that the works 11 and 12 are also axially aligned. The works 11 and 12 are of hollow configuration and have edges 11a and 12a which are adapted to be welded together. The carriages 7 and 8 are slidable toward each other so that the works 11 and 12 can be brought into abutting engagement at their edges 11a and 12a.

The carriage 6 carries a hot air blasting device 13 which has a hot air blast nozzle 20. The nozzle 20 is arranged so that is can be placed between the works 11 and 12 on the work holders 4 and 5 by moving the carriage 6 toward the carriages 7 and 8 when the works 11 and 12 are held apart as shown in FIGS. 1 and 2.

Figure 4:
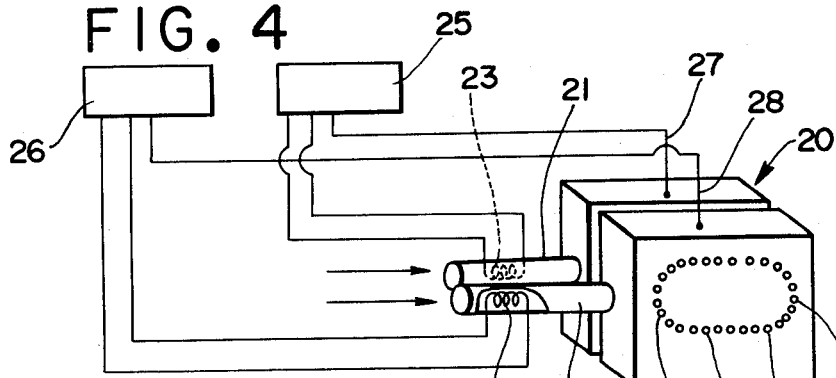
FIG. 4 is a diagrammatical perspective view of the air blast nozzle in accordance with one embodiment of the present invention.
Figure 5:
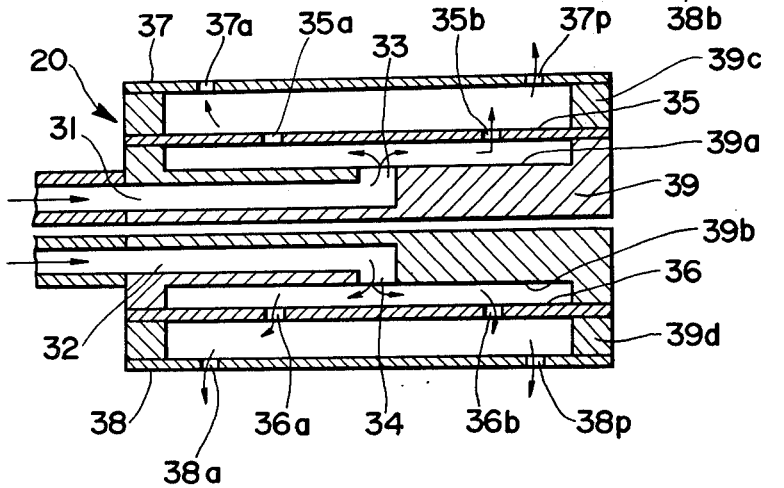
FIG. 5 is a horizontal sectional view of the nozzle shown in FIG. 4.

Referring now to FIGS. 4 and 5, there is shown an example of the hot air blast nozzle 20. The nozzle 20 comprises a body 39 formed with a pair of separate passages 31 and 32 which are connected respectively through conduits 21 and 22 with the air blasting device 13 so that they are supplied with air. In the conduits 21 and 22, there are provided heaters 23 and 24, respectively, which are connected respectively with temperature control devices 25 and 26. The temperature control devices 25 and 26 receives temperature signals from temperature sensors 27 and 28 which are respectively located in the passages 31 and 32 so as to maintain the air passing through the conduits 31 and 32 at desired temperatures.

The nozzle body 39 is formed at its opposite sides with recesses 39a and 39b and the passages 31 and 32 are respectively connected through ports 33 and 34 into the recesses 39a and 39b. The recesses 39a and 39b of the body 39 are respectively covered by plates 35 and 36 to form inner chambers, and these plates 35, 36 are provided with apertures 35a, 35b and 36a, 36b, respectively. An outer plate 37 is attached to but spaced from the plate 35 through a spacer 39c to form an outer chamber 39a. The outer plate 37 is formed with a plurality of small apertures 37a through 37p which are arranged in a configuration corresponding to the configuration of the edge 12a of the work 12. Similarly, an outer plate 38 is attached to but spaced from the plate 36 through a spacer 39d to form another outer chamber. Plate 36 has a plurality of apertures 38a through 38p arranged in a configuration corresponding to the configuration of the edge 11a of the work 11. Thus, when the nozzle 20 is placed between the works 11 and 12 by slidably moving the carriage 6, the apertures 37a through 37p and 38a through 38p are placed opposite to the edges 12a and 11b, respectively, of the works 12 and 11 so that hot air blasts are applied to the work edges. The temperature control devices 25 and 26 function to control the temperatures of the air blasts applied respectively to the edges 12a and 11a of the works so that the edges are softened substantially at the same time even when the works 11 and 12 are made of materials having different melting points.

Figure 6:
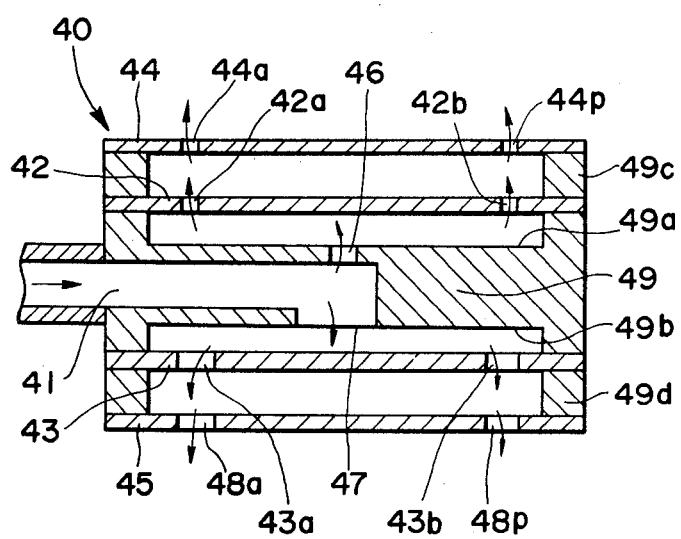
FIG. 6 is a sectional view similar to FIG. 5 but showing another embodiment of the present invention.

Referring now to FIG. 6, the hot air blast nozzle 40 shown therein includes a body 49 formed with a common passage 41 connected with a source of hot air (not shown). As in the previous embodiment, the body 49 is formed at its opposite sides with recesses 49a and 49b. The passage 41 opens into the recess 49a through a port 46 of relatively small area and into the recess 49b through a port 47 of relatively large area. The recess 49a is covered by a plate 42 formed with apertures 42a and 42b, and an outer plate 44 is attached to but spaced from the plate 42 through a spacer 49c. Similarly, recess 49b is covered by a plate 43 formed with apertures 43a and 43b and an outer plate 45 is attached to the plate 43 through a spacer 49d. As in the previous embodiments, the outer plates 44 and 45 are formed with apertures 44a through 44p and 45a through 45p, respectively, which are arranged in configurations corresponding to the configurations of the edges 12a and 11a of the works 12 and 11, respectively.

Figure 7:
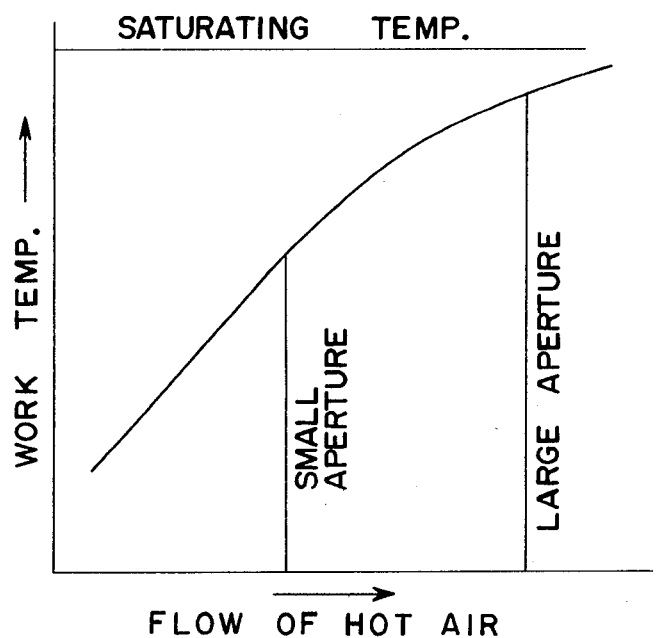
FIG. 7 is a diagram showing the relationship between the hot air flow and the heated temperature of the work welding surface; and, FIG. 8 shows steps of welding plastic parts by using the apparatus embodying the features of the present invention.

In the structure shown in FIG. 6a, different amount of air is supplied through the apertures 44a and 44p in the outer plate 44 than through the apertures 48a through 48p in the outer plate 45 due to the difference in areas of the ports 46 and 47. As shown in FIG. 7, the temperature of the work is dependent on the flow of the hot air blast. It will therefore be understood that the works 11 and 12 can be heated to different temperatures by using the nozzle 40.

Figure 8:
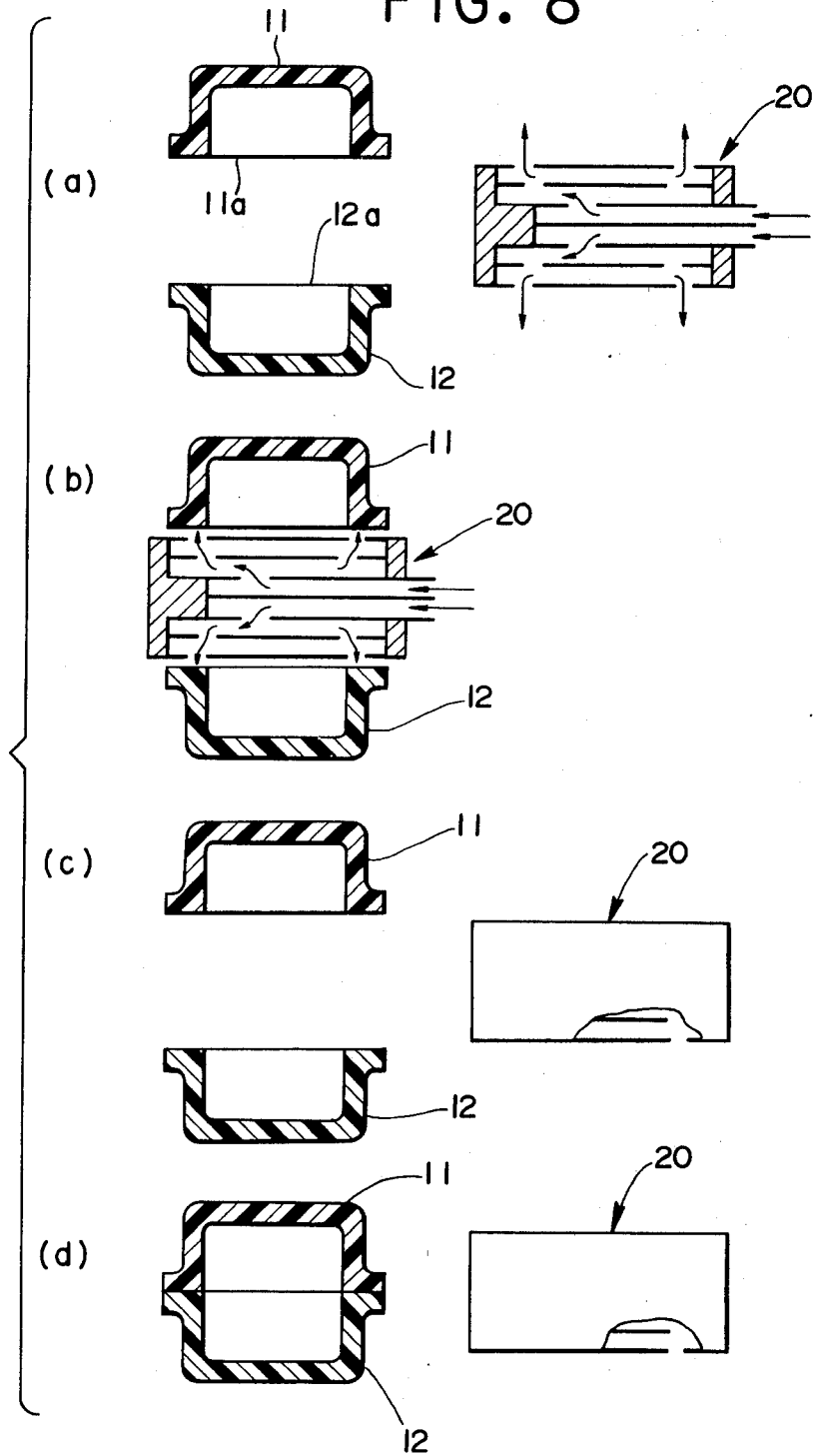

FIG. 8 shows steps of welding the hollow plastic parts 11 and 12 using the nozzle 20 shown in FIGS. 4 and 5. As shown in FIG. 8(a), the works 11 and 12 are held with a certain distance therebetween and the edges 11a and 12a are faced to each other. Then, the nozzle 20 is placed between the works 11 and 12 as shown in FIG. 8(b) so that hot air blast is applied to the edges 11a and 12a. As described previously, the air applied to the edge 11a of the work 11 is of different temperature than the air applied to the edge 12a of the work 12 so that the edges 11a and 12a are heated to different temperatures which are suitable for softening the respective materials of the works 11 and 12. After the materials in the edges 11a and 12a have been softened, the nozzle 20 is retracted as shown in FIG. 8(c) and the works 11 and 12 are brought into abutting engagement as shown in FIG. 8(d). Since the edges 11a and 12a are softened in advance by the hot air blast, the works 11 and 12 are welded together.

The invention has thus been shown and described with reference to specific embodiments, however, it should be noted that the invention is in no way limited to the details of the illustrated structures but changes and modifications may be made without departing from the scope of the appended claims.

We claim:

1. A hot-air-blast welding apparatus comprising a pair of opposed, work-holding arms which are movable toward and away from each other and respectively have means for holding hollow works having edges to be welded together, hot-air blasting means including hot-air blast nozzle means movable between an operative position in which said nozzle means are located between the works held on said arms and a retracted position in which said nozzle means are retracted so that the works on the arms can be brought into abutting engagement with each other by moving the arms toward each other, and including a conduit connected to said nozzle means for supplying hot air to said nozzle means, said nozzle means being formed with first nozzle openings facing toward one work held on one of the arms and second nozzle openings facing toward the other work held on the other arm, said conduit commonly supplying hot air to said first and second nozzle openings, said nozzle means having means for directing different amounts of hot air respectively to the first and second nozzle openings including air ports respectively leading to the first and second nozzle openings, said ports having different effective areas.

2. A hot-air-blast welding apparatus in accordance with claim 1 in which said first and second nozzle openings include a plurality of small apertures arranged in shapes corresponding to edges of the work to be welded so that the edges are effectively supplied with blasts of hot air.

3. A hot-air-blast welding apparatus in accordance with claim 1 wherein said hot-air blasting means further include a hot-blast air source connected to said conduit.

* * * * *